United States Patent Office 3,567,742
Patented Mar. 2, 1971

3,567,742
DIETHYL ALPHA-FLUORO-ALPHA-SUBSTITUTED MALONATES
Bruno Cavalleri, Milan, and Elvio Bellasio, Albate, Italy, and Emilio Testa, Ticino, Switzerland, assignors to Lepetit S.p.A. Gruppo per la Ricerca Farmaceutica, Milan, Italy
No Drawing. Filed May 3, 1968, Ser. No. 726,557
Claims priority, application Great Britain, May 12, 1967, 22,258/67
Int. Cl. C07c 69/76; C07d 5/44
U.S. Cl. 260—346.2  3 Claims

ABSTRACT OF THE DISCLOSURE

The invention is concerned with diethyl α-fluoro-α-aryl-malonate and diethyl α-fluoro-α-(2-dibenzofuranyl)-malonate and a process for their preparation. The new substances possess high antiinflammatory activity.

This invention is concerned with a new class of compounds and with a method for preparing them. More particularly the compounds of the invention are represented by the following formula $$R-\underset{\underset{COOC_2H_5}{|}}{\overset{\overset{COOC_2H_5}{|}}{C}}F$$

wherein R is a member of the class consisting of aryl and dibenzofuranyl.

The process for preparing the new class of compounds consists in heating a compound of the formula $$R-CH_2-COOC_2H_5$$

wherein R has the above significance, with a compound selected from sodium hydride and sodium ethoxide and a compound of the class consisting of diethyl carbonate and diethyl oxalate. An anhydrous solvent such as benzene may also be present. The ratios between the reactants are of 1 to 1.5 mole of sodium hydride or ethoxide for each mole of the acetic ester, while the diethyl carbonate and oxalate can be used also in a larger excess. The formed compound (B) is then reacted with an about equimolecular amount of perchloryl fluoride in the presence of sodium hydride in an inert organic solvent, thus obtaining the corresponding α-fluoro-derivative.

The process is further illustrated by the following flow diagram:

$$R-CH_2-COOC_2H_5 \xrightarrow[\text{NaOC_2H_5 or NaH}]{\overset{(COOC_2H_5)_2 \text{ or } CO(OC_2H_5)_2}{}} \underset{(B)}{R-\underset{\underset{COOC_2H_5}{|}}{\overset{\overset{COOC_2H_5}{|}}{C}}H} \xrightarrow[\text{NaH}]{ClO_3F} \underset{(C)}{R-\underset{\underset{COOC_2H_5}{|}}{\overset{\overset{COOC_2H_5}{|}}{C}}F}$$

(A)

A number of derivatives embraced by the generic formula above show a marked antiinflammatory activity. In this connection we have summarized in Table I the pharmacological results relating to some compounds of the invention and more particularly the percent decrease of the granuloma caused by subcutaneously implanted cotton pellets, as well as the percent decrease of the carrageenin edema, in rats, to which the compounds were administered at different doses, by oral route. The oral $LD_{50}$ in mice is also reported.

TABLE 1

| Compound | $LD_{50}$ in mice, mg./kg. per os | Dose in rats, mg./kg. per os | Carrageenin edema decrease, percent | Pellets percent decrease in weight of granuloma |
|---|---|---|---|---|
| 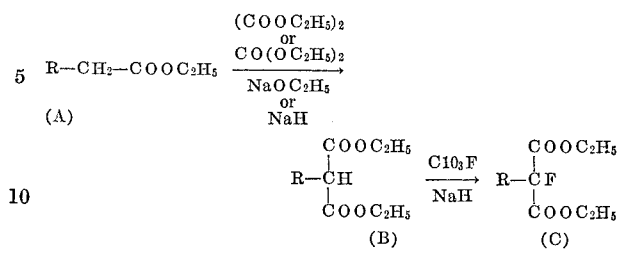 | 1,000 | 100<br>200 | 27.7<br>40.3 | 25.1<br>32.8 |
| 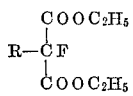<br>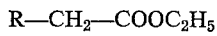 | 1,000 | 50<br>100<br>200 | 6.6<br>16.6<br>56.0 | ----<br>----<br>27.3 |

Surprising results were obtained with ointments intended for dermatological use, containing 0.1–1.0 g. of diethyl α-(p-ethoxyphenyl-α-fluoro-malonate per gram together with usual excipients, having for instance, the following compositions:

(a)

|   | Percent |
|---|---|
| Polyoxyethyleneglycol 400 | 51.7 |
| Polyoxyethyleneglycol | 32.7 |
| Ethanol | 1.7 |

Water q.s. to 100.

(b)

|   | G. |
|---|---|
| Cetyl alcohol | 5.0 |
| Polyethyleneglycol 4000 | 35.0 |
| Polyethyleneglycol 300 q.s. to | 100 |

A complete recovery was obtained in practically all the cases of eczema, of allergic dermatitis and other skin diseases. Very good results were also achieved by oral administration of the compounds described, in the case of rheumatic and arthritic diseases, employing as administration form, for instance, tablets or capsules respectively of the following compositions, to be administered 2–5 times a day, according to the severity of the disease.

|  | Mg. |
|---|---|
| (a) Diethyl α-(p-ethoxyphenyl-α-fluoro-malonate | 100 |
| Levilite | 150 |
| Starch | 50 |
| Mg stearate | 2 |
| (b) Diethyl α - (p - ethoxyphenyl) - α - fluoro-malonate | 100 |
| Avicel | 50 |
| Talc | 100 |
| Starch | 50 |
| Mg stearate | 2 |
| (c) Diethyl α-(2-dibenzofuranyl) - α - fluoro-malonate | 150 |
| Avicel | 70 |
| Starch | 70 |
| Stearic acid | 5 |
| Mg stearate | 5 |

Good results were also obtained by intramuscular and rectal administration of doses ranging from 0.1 to 0.9 g. A suspension or suppositories having the following compositions can be used respectively in the two cases.

AMPOULES I.M.

|  | Mg. |
|---|---|
| Diethyl α-(2-dibenzofuranyl)-α-fluoro-malonate | 300 |
| Sodium carboxymethyl cellulose | 20 |
| NaCl | 15 |
| Tween 80 | 12 |
| Tween 81 | 10 |
| Benzyl alcohol | 15 |
| Water, q.s. to 3 ml. |  |

SUPPOSITORIES

| (a) | G. |
|---|---|
| Diethyl α-(2-dibenzofuranyl)-α-fluoro-malonate | 0.300 |
| Witepsol W 45 | 0.200 |
| Witepsol E 75 | 1.700 |
| Tween 61 | 0.100 |
| (b) |  |
| Diethyl α-(p-ethoxyphenyl)-α-fluoro-malonate | 0.200 |
| Witepsol E 75 | 2.000 |
| Levilite | 0.100 |
| Tween 61 | 0.050 |

The following nonlimitative examples illustrate the invention.

EXAMPLE 1

Preparation of diethyl α-(p-methoxyphenyl)-α-fluoro-malonate

To a suspension of 21.9 g. of a 50% solution of sodium hydride in liquid petrolatum, in 530 ml. of anhydrous benzene, cooled at 15° C., 66.6 g. of diethyl oxalate are added. The mixture is stirred for 15 minutes, then 86.5 g. of ethyl p-methoxyphenylacetate are added. After stirring for 20 minutes, 20 ml. of anhydrous ethanol are added cautiously, letting the temperature rise. The mixture is stirred during an hour, allowed to stand overnight, then refluxed for 2 hours. The solvent is distilled off in vacuo and the residue washed several times from liquid petrolatum, with petroleum ether, then with diethyl ether. The solid is dissolved in 600 ml. of water, and the solution acidified with 100 ml. of a 10% sulfuric acid solution, is extracted several times with diethyl ether. The combined ether extracts are washed with water, dried over sodium sulfate, and the ether is distilled off. The residue is heated at 180° C. under a pressure of 15 mm. of Hg until no more gas develops, then is distilled under a pressure not exceeding 0.5 mm. This is diethyl α-(p-methoxyphenyl)-malonate. Yield 76.7 g.; B.P. 146–147° C./1 mm Hg.

Analysis.—Calc'd for $C_{14}H_{18}O_5$ (percent): C, 63.05; H, 6.90. Found (percent): C, 63.14; H, 6.81.

An amount of 138 g. of diethyl α-(p-methoxyphenyl)-malonate is added to a suspension of 32.6 g. of a 50% sodium hydride solution in liquid petrolatum, in 1400 ml. of dimethylformamide. After stirring for one hour the mixture at room temperature in a nitrogen atmosphere, the excess of sodium hydride is decomposed by adding 9 ml. of anhydrous ethanol, then a stream of perchloryl fluoride is bubbled through the mixture, keeping the temperature between 0° and 10° C. in the presence of bromothymol blue, to the change of color of the indicator. After bubbling nitrogen for some time, the reaction mixture is poured into 2 liters of water, and extracted with diethyl ether several times. The combined ether extracts are washed with water, dried over sodium sulfate, and concentrated. After removing the liquid petrolatum layer, the residue is washed with petroleum ether, and the final compound is separated by means of a fractionate distillation in vacuo. This is diethyl α-(p-methoxyphenyl)-α-fluoro-malonate. Yield 127 g.; B.P. 125–130°/0.2 mm. Hg; $n_D^{20}=1.5013$.

Analysis.—Calc'd for $C_{14}H_{17}FO_5$ (percent): C, 59.14; H, 6.02; F, 6.68. Found (percent): C, 58.96; H, 6.22; F, 6.66.

EXAMPLE 2

Preparation of diethyl α-(p-ethoxyphenyl)-α-fluoro-malonate

It is prepared by substantially the same process described in Example 1.

From 148 g. of ethyl p-ethoxyphenylacetate 140 g. of diethyl α-(p-ethoxyphenyl)-malonate are obtained; M.P. 36–38°, $n_D^{20}=1.5076$.

Analysis.—Calc'd for $C_{15}H_{20}O_5$ (percent): C, 64.27; H, 7.19. Found (percent): C, 64.41; H, 6.99.

From 122 g. of diethyl α-(p-ethoxyphenyl)-malonate 119.5 g. of diethyl α-(p-ethoxyphenyl)-α-fluoro-malonate are obtained; B.P. 140° C./0.4 mm. Hg; $n_D^{20}=1.5034$.

Analysis.—Calc'd for $C_{15}H_{19}FO_5$ (percent): C, 60.41; H, 6.42; F, 6.37. Found (percent): C, 60.32; H, 6.33; F, 6.23.

EXAMPLE 3

Preparation of diethyl α-(1-naphthyl)-α-fluoro-malonate

It is prepared according to the process described in Example 1. An amount of 25 g. of ethyl 1-naphthylacetate gives 25.1 g. of diethyl α-(1-naphthyl)-malonate. B.P. 150–154°/0.2 mm. Hg. From 102.5 g. of diethyl α-(1-naphthyl)-malonate 97.1 g. of diethyl α-(1-naphthyl)-α-fluoro-malonate are obtained. M.P. 82–83° C.

Analysis.—Calc'd for $C_{17}H_{17}FO_4$ (percent): C, 67.09; H, 5.63; F, 6.24. Found (percent): C, 67.01; H, 5.79; F, 6.27.

EXAMPLE 4

Preparation of diethyl α-(p-isobutylphenyl)-α-fluoro-malonate

An amount of 13.9 g. of sodium are dissolved in 300 ml. of an ethanol, then the ethanol is distilled off an oil-bath. The residue is taken up with 220 ml. of diethyl carbonate, then a solution of 102.5 g. of ethyl p-isobutylacetate in 110 ml. of diethyl carbonate is added slowly during two hours raising the temperature of the bath gradually up to 160° C. until all of the solvent is removed. The mixture is poured into ice-water, then hydrochloric acid is added until the solution is acidic to Congo red. The mixture is extracted repeatedly with diethyl ether, the combined extracts are washed with water, dried on sodium sulfate and concentrated to dryness. The residue is distilled in vacuo, to give 11.4 g. of diethyl α-(p-isobutylphenyl)-malonate. B.P. 140° C./0.2 mm. Hg, $n_D^{20}=1.4980$.

Analysis.—Calc'd for $C_{17}H_{24}O_4$ (percent): C, 69.83; H, 8.27. Found (percent): C, 69.76; H, 8.22.

To 500 ml. of dimethylformamide 6.8 g. of a 50% solution of sodium hydride in liquid petrolatum and 38.5 g. of diethyl α-(p-isobutylphenyl)-malonate are added. The suspension is stirred for 30 minutes and cooled at 5–10° C. One ml. of anhydrous ethanol is added to decompose the excess of sodium hydride, then a stream of perchloryl fluoride is bubbled through the mixture until the bromothymol blue, previously added as the indicator, changes of color. After bubbling nitrogen for some minutes, the reaction mixture is poured into water, and extracted with diethyl ether. The ether extracts, after washing with water and drying over sodium sulfate, are concentrated to dryness. The residue is distilled in vacuo to give 36.6 g. of diethyl α-(p-isobutylphenyl)-α-fluoromalonate. B.P. 131° C./0.2 mm. Hg $n_D^{20}$=1.4923.

*Analysis.*—Calculated for $C_{17}H_{23}FO_4$ (percent): C, 65.76; H, 7.64; F, 6.12. Found (percent): C, 65.62; H, 7.62; F, 5.5.

EXAMPLE 5

Preparation of diethyl α-(2-dibenzofuranyl)-α-fluoromalonate

An amount of 8.6 g. of sodium is dissolved in 240 ml. of anhydrous ethanol, then the solvent is distilled off on an oil-bath. The residue of sodium ethoxide is dissolved in 250 ml. of diethyl carbonate, then a solution of 69 g. of ethyl 2-dibenzofuranylacetate in 250 ml. of diethyl carbonate is added slowly during 2½ hours. The temperature of the bath is raised up to 150° C. until the solvent is completely removed. The mixture is then poured into ice-water, acidified with hydrochloric acid, and extracted with diethyl ether. The ether extracts are dried over sodium sulfate and concentrated to dryness. The residue is recrystallized from isopropyl ether to give 67 g. of diethyl α-(2-dibenzofuranyl)-malonate. M.P. 84.5–85° C.

*Analysis.*—Calculated for $C_{19}H_{18}O_5$ (percent): C, 69.92; H, 5.56. Found (percent): C, 70.11; H, 5.39.

To 9.8 g. of diethyl α-(2-dibenzofuranyl)-malonate dissolved in 40 ml. of dimethylformamide a mixture of 40 ml. of dimethylformamide and 1.7 g. of a 50% solution of sodium hydride in liquid petrolatum is added. The suspension is stirred for 30 minutes, then 0.5 ml. of anhydrous ethanol are added to decompose the excess of sodium hydride. Bromophenol blue is added as the indicator, then, after cooling at 0–5° C., a stream of perchloryl fluoride is bubbled into the liquid, until the indicator changes in color. After removing the excess of perchloryl fluoride with the aid of a nitrogen stream, the mixture is poured into 500 ml. of water and extracted several times with diethyl ether. The combined ether extracts are washed with water, dried over sodium sulfate and the solvent distilled off. The residue is cooled on ice and the formed crystals are washed from the liquid petrolatum by means of petroleum ether, and finally recrystallized from methanol. This is diethyl α-(2-dibenzofuranyl)-α-fluoride with the aid of a nitrogen stream, the mixture is

*Analysis.*—Calculated for $C_{19}H_{17}FO_5$ (percent): C, 66.26; H, 4.97; F, 5.51. Found (percent): C, 66.08; H, 4.96; F, 5.31.

We claim:
1. A compound of the formula

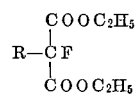

wherein R is a member of the class consisting of p-methoxyphenyl, p-ethoxyphenyl, p-isobutylphenyl, 1-naphthyl, and 2-dibenzofuranyl.

2. A compound as in claim 1, wherein R is p-ethoxyphenyl.

3. A compound as in claim 1, wherein R is 2-dibenzofuranyl.

References Cited

UNITED STATES PATENTS 3,030,408  4/1962  Inman et al. _____ 260—475

OTHER REFERENCES

Wagner and Zook—Synthetic Organic Chemistry, New York—John Wiley.

BERNARD I. DENTZ, Primary Examiner

U.S. Cl. X.R.

260—475; 424—285, 308